United States Patent
Hirano et al.

(10) Patent No.: US 8,411,535 B1
(45) Date of Patent: Apr. 2, 2013

(54) ELECTRICAL CONNECTION FOR A LASER DIODE IN A TAR HEAD

(75) Inventors: Toshiki Hirano, San Jose, CA (US); Fu-Ying Huang, San Jose, CA (US); Barry Cushing Stipe, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/308,348

(22) Filed: Nov. 30, 2011

(51) Int. Cl.
*G11B 11/00* (2006.01)
(52) U.S. Cl. .................................................. 369/13.32
(58) Field of Classification Search .................. None
See application file for complete search history.

(56) References Cited

U.S. PATENT DOCUMENTS

| | | | |
|---|---|---|---|
| 5,187,623 A | 2/1993 | Ibaraki | |
| 6,404,706 B1 | 6/2002 | Stovall et al. | |
| 7,450,342 B2 | 11/2008 | White et al. | |
| 7,535,676 B2 | 5/2009 | Lille | |
| 7,538,978 B2 | 5/2009 | Sato et al. | |
| 7,804,655 B2 | 9/2010 | Shimazawa et al. | |
| 7,864,635 B2 | 1/2011 | Shimizu | |
| 7,921,436 B2 | 4/2011 | Shimizu et al. | |
| 2008/0316872 A1 | 12/2008 | Shimizu et al. | |
| 2009/0052078 A1 | 2/2009 | Tanaka et al. | |
| 2009/0195930 A1 | 8/2009 | Lille | |
| 2009/0225636 A1 | 9/2009 | Hirano et al. | |
| 2009/0266789 A1 | 10/2009 | Shimazawa et al. | |
| 2010/0097724 A1 | 4/2010 | Shimazawa et al. | |
| 2010/0238581 A1 | 9/2010 | Nakamura et al. | |
| 2010/0328807 A1 | 12/2010 | Snyder et al. | |
| 2011/0026156 A1 | 2/2011 | Shimazawa et al. | |
| 2011/0128827 A1 | 6/2011 | Shimazawa et al. | |
| 2011/0149698 A1 | 6/2011 | Naniwa et al. | |

FOREIGN PATENT DOCUMENTS

| | | |
|---|---|---|
| JP | 62-73411 A | 4/1987 |
| JP | 07-32705 U | 6/1995 |
| JP | 11-120514 A | 4/1999 |
| JP | 2010-211875 A | 9/2010 |
| JP | 2011-096857 A | 5/2011 |

*Primary Examiner* — Paul Huber
(74) *Attorney, Agent, or Firm* — Patterson & Sheridan, LLP

(57) ABSTRACT

The present invention generally relates to electrically connecting a laser diode to a slider and head assembly of a TAR head in a HDD. The laser diode is coupled to a sub-mount. The laser diode and the sub-mount are coupled to the top surface of the slider and/or the head assembly. Either the slider, the head assembly or both have bond pads exposed through their respective top surfaces to provide an electrical connection to both the laser diode and the sub-mount. Both the laser diode and the sub-mount have electrodes thereon that are perpendicular to the bond pads and are in contact with the bond pads. Conductive bonding material is used to not only bond the laser diode and the sub-mount to the bond pads, but also to electrically connect the bond pads to the electrodes.

25 Claims, 6 Drawing Sheets

ELECTRICAL CONNECTION FOR A LASER DIODE IN A TAR HEAD

BACKGROUND OF THE INVENTION

1. Field of the Invention

Embodiments of the present invention generally relate to thermal assisted recording (TAR) read/write head in a hard disk drive (HDD).

2. Description of the Related Art

Higher storage bit densities in magnetic media used in disk drives have reduced the size (volume) of data cells to the point where the cell dimensions are limited by the grain size of the magnetic material. Although grain size can be reduced further, the data stored within the cells may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, requires write heads that incorporate higher magnetic moment materials, or techniques such as perpendicular recording (or both).

One additional solution has been proposed, which uses heat to lower the effective coercivity of a localized region on the magnetic media surface and writes data within this heated region. The data state becomes "fixed" upon cooling the media to ambient temperatures. This technique is broadly referred to as TAR or thermally assisted magnetic recording (TAMR), energy assisted magnetic recording (EAMR), or heat-assisted magnetic recording (HAMR) which are used interchangeably herein. TAR can be applied to longitudinal and perpendicular recording systems as well as "bit patterned media". Heating of the media surface has been accomplished by a number of techniques such as focused laser beams or near-field optical sources.

SUMMARY OF THE INVENTION

The present invention generally relates to electrically connecting a laser diode to a slider and head assembly of a TAR head in a HDD. The laser diode is coupled to a sub-mount. The laser diode and the sub-mount are coupled to the top surface of the slider and/or the head assembly. Either the slider, the head assembly or both have bond pads exposed through their respective top surfaces to provide an electrical connection to both the laser diode and the sub-mount. Both the laser diode and the sub-mount have electrodes thereon that are perpendicular to the bond pads and are in contact with the bond pads. Conductive bonding material is used to not only bond the laser diode and the sub-mount to the bond pads, but also to electrically connect the bond pads to the electrodes.

In one embodiment, a thermal assisted recording head, comprises a slider; a head assembly coupled to the slider, the head assembly having an air bearing surface and a top surface opposite the air bearing surface, the head assembly comprising an insulating material and a bond pad embedded within the insulating material, wherein the bond pad is exposed through the top surface; a laser diode having a bottom surface in contact with the top surface of the slider and the head assembly, the laser diode having an electrode extending perpendicular to the bond pad and in close proximity to the bond pad; and a conductive bonding material coupled to the bond pad and the electrode.

In another embodiment, a thermal assisted recording head, comprising: a slider comprising a first bond pad fabricated on a top surface of the slider; a head assembly coupled to the slider, the head assembly having an air bearing surface and a top surface opposite the air bearing surface, the head assembly comprising an insulating material and a second bond pad embedded within the insulating material, wherein the second bond pad is exposed through the top surface; an electrically conductive trace coupled to the first bond pad and the second bond pad; a laser diode having a bottom surface in contact with the top surface of the slider and the head assembly, the laser diode having an electrode extending perpendicular to the first bond pad and in close proximity to the first bond pad; and a conductive bonding material coupled to the first bond pad and the electrode.

In another embodiment, a thermal assisted recording head, comprises a slider and a bond pad fabricated on a top surface of the slider; a head assembly coupled to the slider, the head assembly having an air bearing surface and a top surface opposite the air bearing surface, the head assembly comprising an insulating material; a laser diode having a bottom surface in contact with the top surface of the slider and the head assembly, the laser diode having an electrode extending perpendicular to the bond pad and in close proximity to the bond pad; and a conductive bonding material coupled to the bond pad and the electrode.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention generally relates to electrically connecting a laser diode to a slider and head assembly of a TAR head in a HDD. The laser diode is coupled to a sub-mount. The laser diode and the sub-mount are coupled to the top surface of the slider and/or the head assembly. Either the slider, the head assembly or both have bond pads exposed through their respective top surfaces to provide an electrical connection to both the laser diode and the sub-mount. Both the laser diode and the sub-mount have electrodes thereon that are perpendicular to the bond pads and are in close proximity to the bond pads. Conductive bonding material is used to not only bond the laser diode and the sub-mount to the bond pads, but also to electrically connect the bond pads to the electrodes.

Figure 1A:
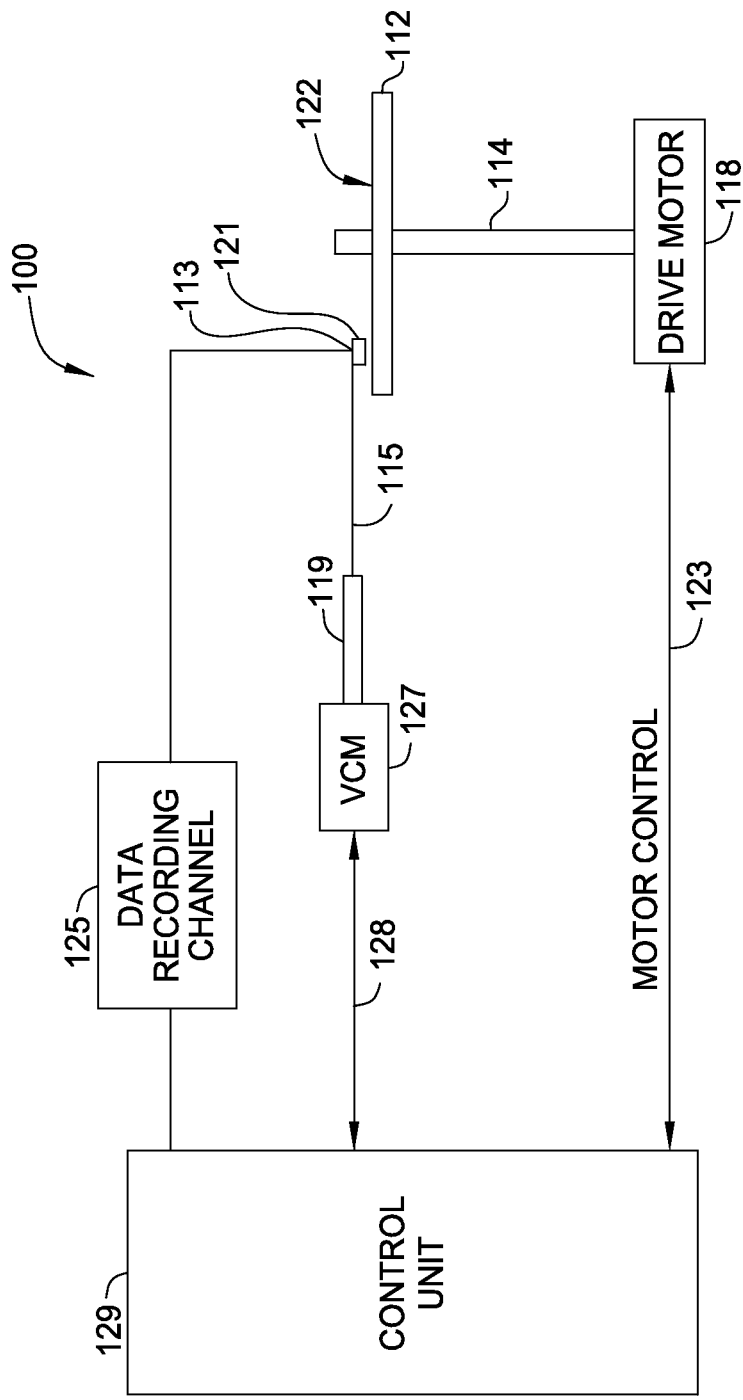
FIGS. 1A and 1B illustrate a disk drive system, according to embodiments of the invention.

FIG. 1A illustrates a disk drive 100 embodying this invention. As shown, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121 that may include a radiation source (e.g., a laser or electrically resistive heater) for heating the disk surface 122. As the magnetic disk rotates, the slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases the slider 113 against the disk surface 122. Each actuator arm 119 is attached to an actuator 127. The actuator 127 as shown in FIG. 1A may be a voice coil motor (VCM). The VCM comprises a coil movable within a fixed magnetic field, the direction and speed of the coil movements being controlled by the motor current signals supplied by control unit 129.

During operation of a TAR enabled disk drive 100, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 off and slightly above the disk 112 surface by a small, substantially constant spacing during normal operation. The radiation source heats up the high-coercivity data bits so that the write elements of the magnetic head assemblies 121 may correctly magnetize the data bits.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1A are for representation purposes only. It should be apparent that disk storage systems may contain a large number of disks and actuators, and each actuator may support a number of sliders.

Figure 1B:
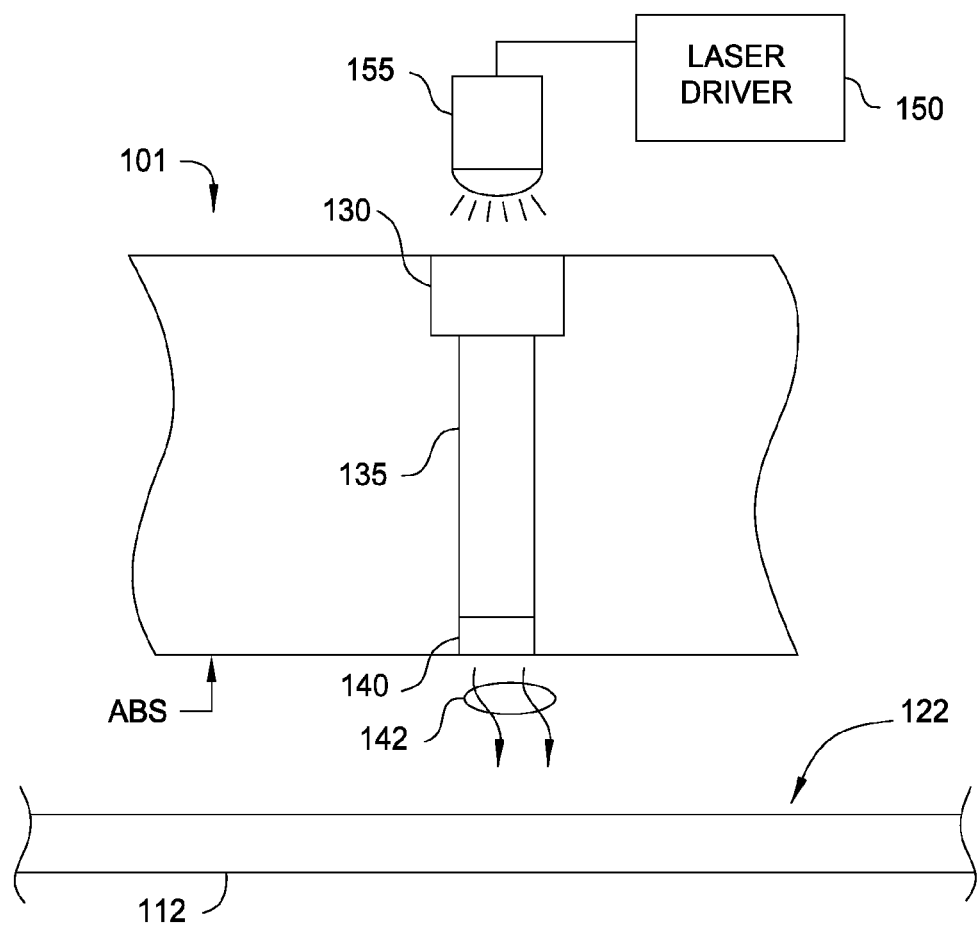

FIG. 1B is a cross sectional schematic of a TAR enabled write head, according to one embodiment of the invention. The head 101 is operatively attached to a laser 155 that is powered by a laser driver 150. The head 101 includes a spot-size converter 130 for focusing the radiation transmitted by the laser 155 into the waveguide 135. In another embodiment, the disk drive 100 may include one or more lens for focusing the beamspot of the laser 155 before the emitted radiation reaches the spot-size converter 130. The waveguide 135 is a channel that transmits the radiation through the height of the head 101 to the near-field transducer 140—e.g., a plasmonic device—which is located at or near the air-bearing surface (ABS). The near-field transducer 140 further focuses the beamspot to avoid heating neighboring tracks of data on the disk 112—i.e., creates a beamspot much smaller than the diffraction limit. As shown by arrows 142, this optical energy emits from the near-field transducer 140 to the disk surface 122 below the ABS of the head 101. The embodiments herein are not limited to any particular type of near-field transducer and may operate with, for example, either a c-aperture, e-antenna plasmonic near-field source, or any other shaped transducer known in the art.

Figure 2A:
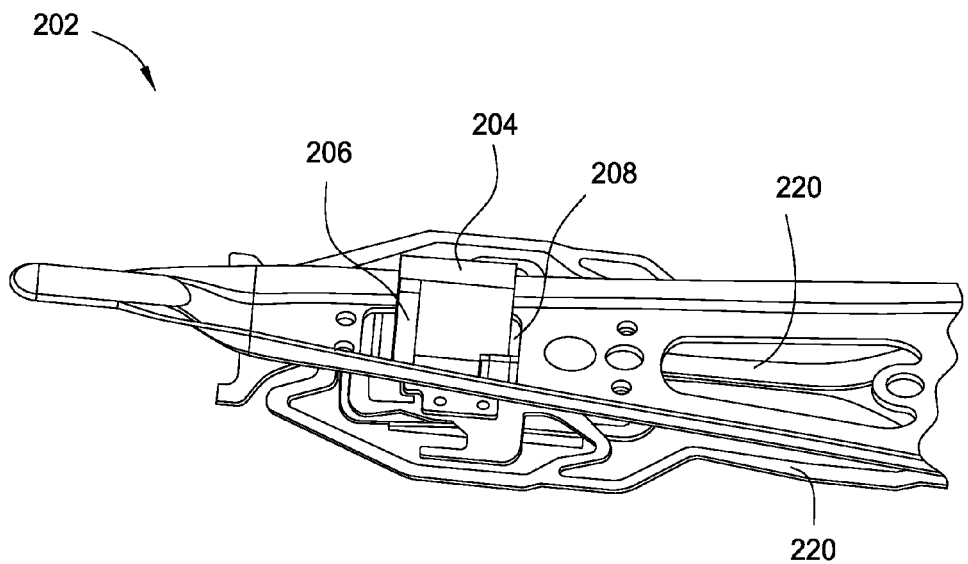
FIG. 2A is an isometric view of a suspension having a slider, laser diode and sub-mount coupled thereto.
Figure 2B:
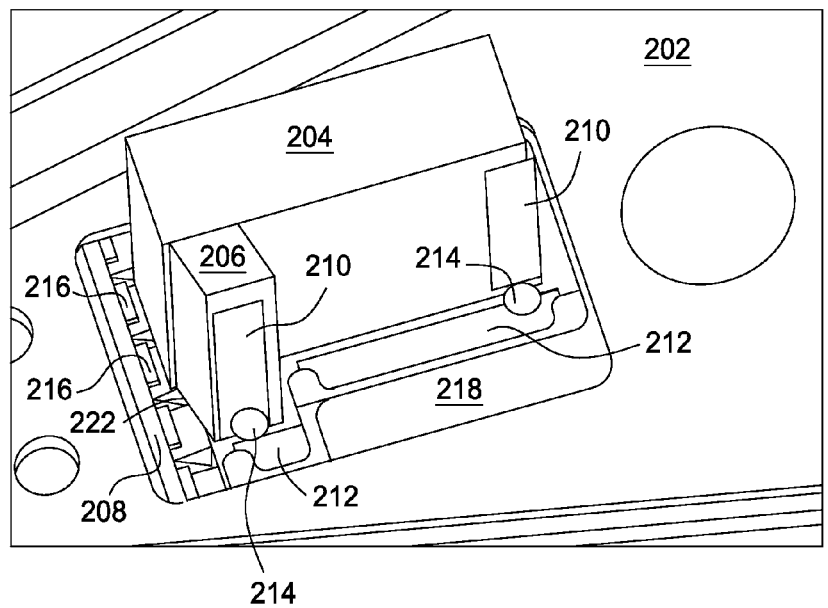
FIG. 2B is a close up view of FIG. 2A.

FIG. 2A is an isometric view of a suspension 202 having a slider 218, laser diode 206 and sub-mount 204 coupled thereto. FIG. 2B is a close up view of FIG. 2A. It is to be understood that while the embodiments will be described with reference to a laser diode, the embodiments are applicable to an energy source, rather than specifically to a laser diode. One of ordinary skill in the art will appreciate that other energy sources, besides laser diodes, are contemplated. As shown in FIG. 2A, the laser diode 206 and the sub-mount 204 extend through an opening 208 in the suspension 202. Power is fed to the head assembly 222 that is coupled to the slider 218 via electrical leads 220. The slider 218 has a plurality of head bond pads 216 through which power is delivered to the slider 218 via electrical leads 220. In order to deliver power to the laser diode 206, the electrodes 210 on both the laser diode 206 and sub-mount 204 is electrically coupled to the bond pads 212 that are on the head assembly 222 that is coupled to the slider 218. In order to bond the bond pads 212 to the electrodes 210, an electrically conductive material 214 is utilized so that electrical current can flow through the bond pads 212, the electrically conductive material 214, and the electrodes 210.

Figure 3A:
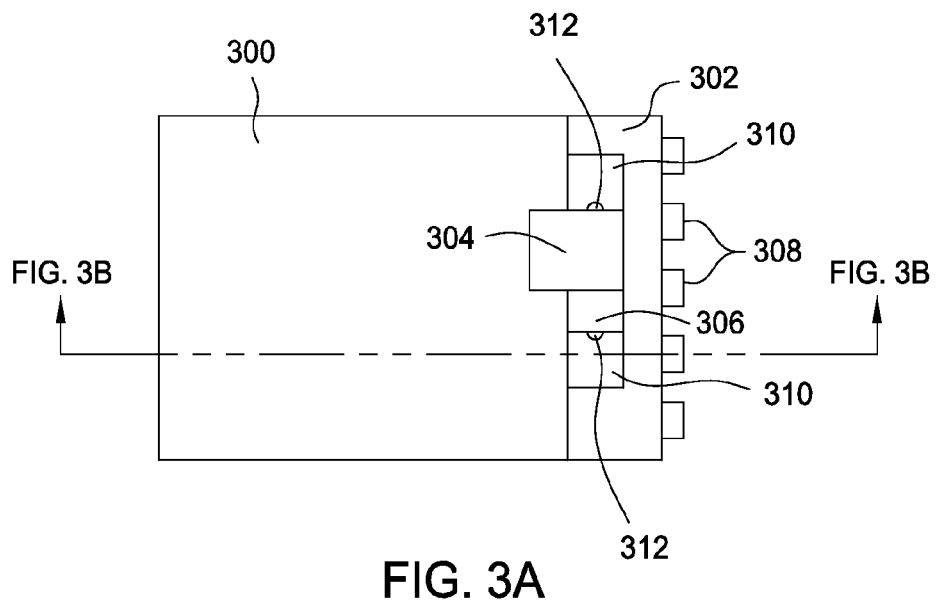
FIGS. 3A and 3B are schematic top and cross-sectional views of a TAR head according to one embodiment.
Figure 3B:
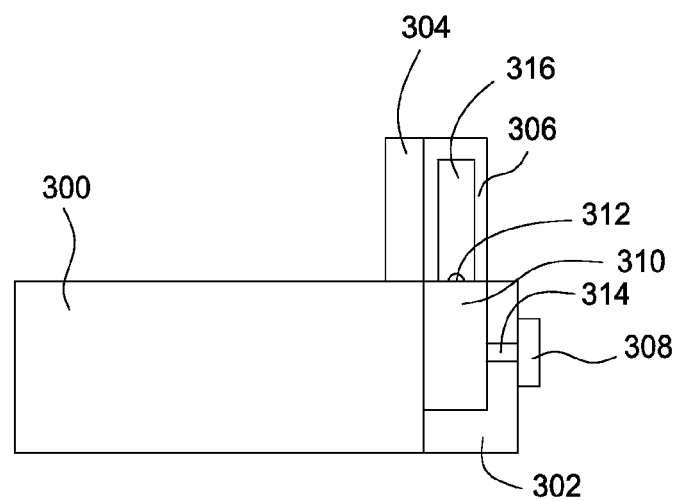

For TAR, the laser diode is attached on a slider, and the electrical connections are made to the laser diode. For a top mount laser diode, the laser diode is located on the top surface (i.e., the opposite side from the ABS) of the slider. FIGS. 3A and 3B are schematic top and cross-sectional views of a TAR head according to one embodiment. Bond pads 310 are fabricated inside the thickness of the insulating layer of the head assembly 302 (i.e., the bond pads 310 embedded within the insulating material of the head assembly 302). Suitable material that may be used for the insulating layer includes alumina ($Al_2O_3$). The bond pads 310 are exposed through the top surface of the head assembly 302. The electrodes 316 for the laser diode 306 and sub-mount 304 are perpendicular to the top surface of the head assembly 302 and also perpendicular to the exposed bond pads 310. The bottom surfaces of the laser diode 306 and the sub-mount 304 are each in contact with one or more of the slider 300 and/or the head assembly 302. Slider body 300 comprises a conductive material, such as Al—Ti—C; therefore, an insulator is disposed between the bonding pads 310 and slider 300. Additionally, the electrodes 316 are in close proximity to the bond pads 310. To ensure a good electrical connection to the bond pads 310, an electrically conductive material 312 is used to not only bond the bond pads 310 to the electrodes 316, but also to permit electrical current to pass from the bond pads 310 to the electrodes 316. In order for the power to reach the bond pads, power is delivered to the head assembly 302 through head bond pads 308 which are coupled to coils 220. The head bond pads 308 are coupled to the bond pads 310 through a conductive trace 314. In the embodiment shown in FIGS. 3A and 3B, the conductive trace 314 is embedded within the insulating material of the head assembly 302.

Figure 4A:
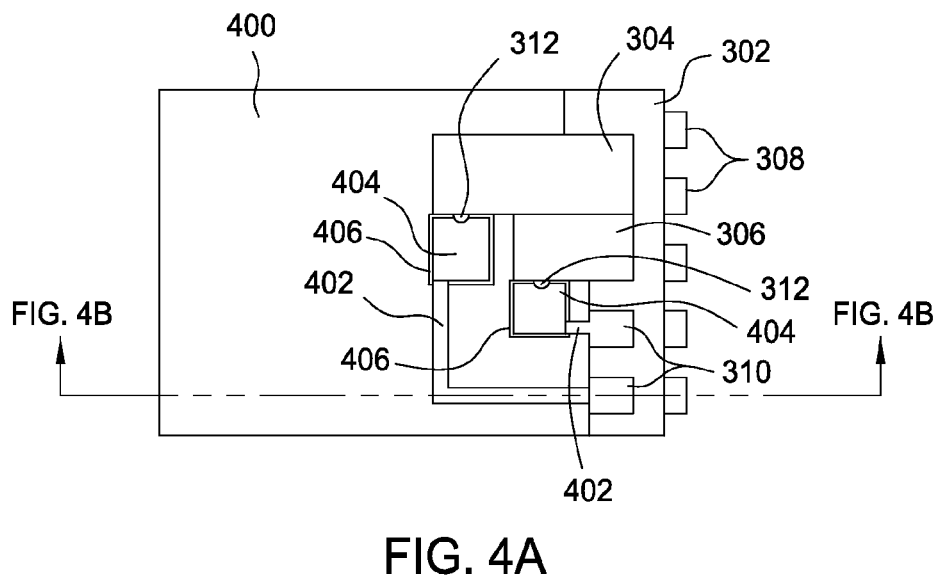
FIGS. 4A and 4B are schematic top and cross-sectional views of a TAR head according to one embodiment.
Figure 4B:
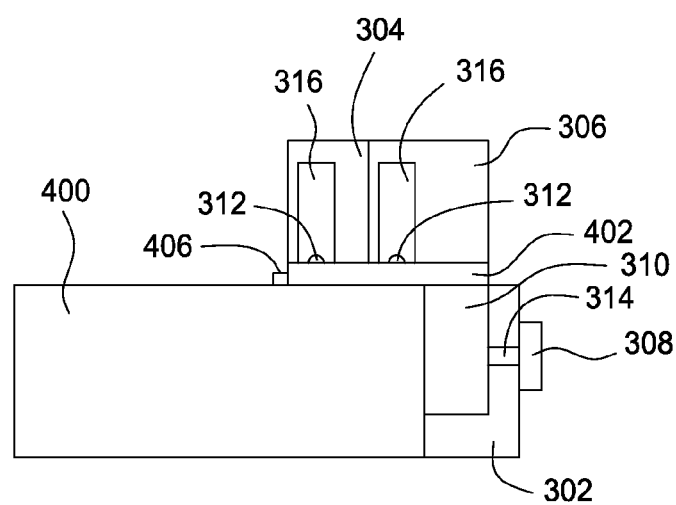

FIGS. 4A and 4B are schematic top and cross-sectional views of a TAR head according to another embodiment. Just as in FIGS. 3A and 3B, the bond pads 310 are fabricated inside the thickness of the insulating layer of the head assembly 302. However, due to the location of the electrodes 316 on the sub-mount 304 and laser diode 304, additional bond pads 404 are fabricated on the top surface of the slider 400. An insulation layer 406 can also be fabricated between bond pads 404 and slider 400, if the slider 400 comprises conductive material. The insulation layer 406 may be fabricated utilizing a lithographic process. The bond pads 310 within the head assembly 302 are electrically connected to the bond pads 404 in the slider 400 by traces 402 that run along the top surface of both the head assembly 302 and the slider 400. Bond pad 310 is embedded within insulating material and has a surface that is exposed through the top surface of the insulating material. To connect the bond pads 404 to the electrodes 316, an electrically conductive material 312 is used as described above with regards to FIGS. 3A and 3B.

Figure 5A:
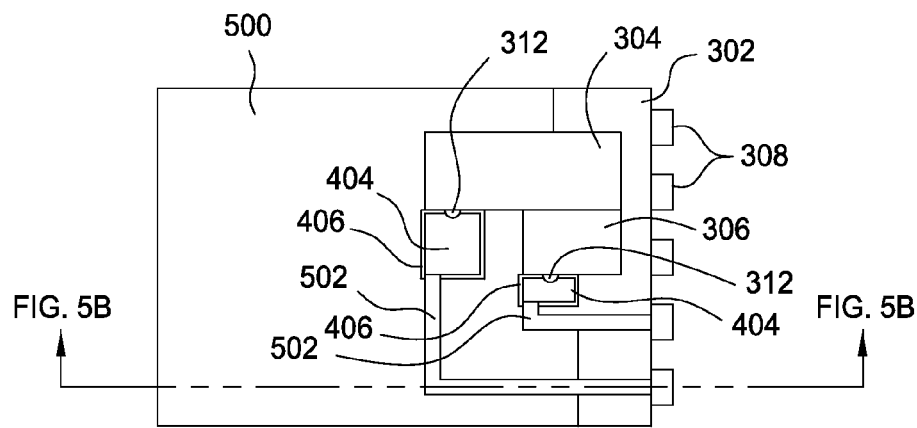
FIGS. 5A and 5B are schematic top and cross-sectional views of a TAR head according to one embodiment.
Figure 5B:
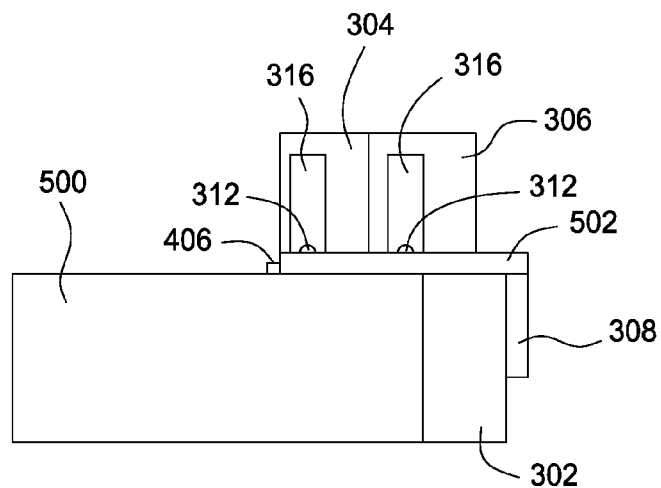

FIGS. 5A and 5B are schematic top and cross-sectional views of a TAR head according to another embodiment. Similar to FIGS. 4A and 4B, bond pads 404 are fabricated on the top surface of the slider 500. An insulating layer 406 may be disposed between the bond pads 404 and the slider 500 is the slider 500 comprises conductive material. However, there are no bond pads 310 present in the insulating material of the head assembly 302. Because there are no bond pads 310 in the insulating material of the head assembly 302, there is no conductive trace embedded within the insulating material of the head assembly 302 that connects the head bond pads to bond pads 310 in the head assembly 302. Rather, the bond pads 404 that are embedded within the slider 500 are directly connected to the head bond pads 308 via electrically conductive traces 502 that extend along the upper surface of the slider 500 and the head assembly 302 and connect directly to the head bond pads 308 that are perpendicular to the top surface of the head assembly 302.

By placing the bottom surface of the laser diode and/or the sub-mount on the top surface of the slider and/or head assembly, the TAR head can be easily assembled. Specifically, electrodes on the laser diode and/or the sub-mount that are perpendicular to the bond pads that are exposed through the top surface of the slider and/or head assembly can be easily electrically connected by having the electrodes in contact with the bond pads and then bonding the bond pads and electrodes together using electrically conductive material such as conductive epoxy or solder. The exposed bond pads may be formed by any lithographic processes that are well known.

While the foregoing is directed to embodiments of the present invention, other and further embodiments of the invention may be devised without departing from the basic scope thereof, and the scope thereof is determined by the claims that follow.

What is claimed is:

1. A recording head, comprising:
   a slider;
   a head assembly coupled to the slider, the head assembly having an air bearing surface and a top surface opposite the air bearing surface, the head assembly comprising an insulating material and a bond pad embedded within the insulating material, wherein the bond pad is exposed through the top surface;
   an energy source having a bottom surface in contact with the top surface of the slider and the head assembly, the energy source having an electrode extending perpendicular to the bond pad and in close proximity to the bond pad; and
   a conductive bonding material coupled to the bond pad and the electrode.

2. The recording head of claim 1, wherein the conductive bonding material comprises a conductive epoxy.

3. The recording head of claim 1, wherein the conductive bonding material comprises solder.

4. The recording head of claim 1, further comprising:
   a second bond pad exposed through the top surface of the head assembly;
   a sub-mount coupled to the energy source, wherein the sub-mount has a second electrode that is perpendicular to the second bond pad; and
   a second conductive material coupled to the second bond pad and the second electrode.

5. The recording head of claim 4, wherein the conductive bonding material is selected from the group consisting of a conductive epoxy and solder.

6. The recording head of claim 5, further comprising a head bond pad coupled to the bond pad via an electrically conductive trace that is embedded within the insulating material of the head assembly.

7. The recording head of claim 1, further comprising a head bond pad coupled to the bond pad via an electrically conductive trace that is embedded within the insulating material of the head assembly.

8. The recording head of claim 1, wherein the energy source is a laser diode and wherein the recording head is a thermal assisted recording head.

9. A recording head, comprising:
   a slider having a first bond pad fabricated on a top surface of the slider;
   a head assembly coupled to the slider, the head assembly having an air bearing surface and a top surface opposite the air bearing surface, the head assembly comprising an insulating material and a second bond pad embedded within the insulating material, wherein the second bond pad is exposed through the top surface;
   an electrically conductive trace coupled to the first bond pad and the second bond pad;
   an energy source having a bottom surface in contact with the top surface of the slider and the head assembly, the energy source having an electrode extending perpendicular to the first bond pad and in close proximity to the first bond pad; and
   a conductive bonding material coupled to the first bond pad and the electrode.

10. The recording head of claim 9, further comprising an insulating layer disposed between the slider and the first bond pad.

11. The recording head of claim 9, wherein the conductive bonding material comprises a conductive epoxy.

12. The recording head of claim 9, wherein the conductive bonding material comprises solder.

13. The recording head of claim 9, further comprising:
a third bond pad fabricated on the top surface of the slider;
a fourth bond pad embedded within the insulating material of the head assembly, wherein the fourth bond pad is exposed through the top surface of the head assembly;
a second electrically conductive trace coupled to the third bond pad and the fourth bond pad;
a sub-mount coupled to the energy source, wherein the sub-mount has a second electrode that is perpendicular to the third bond pad; and
a second conductive material coupled to the third bond pad and the second electrode.

14. The recording head of claim 13, wherein the second electrically conductive trace is disposed along the top surface of the slider.

15. The recording head of claim 14, further comprising a head bond pad coupled to the second bond pad via an electrically conductive trace that is embedded within the insulating material of the head assembly.

16. The recording head of claim 9, further comprising a head bond pad coupled to the second bond pad via an electrically conductive trace that is embedded within the insulating material of the head assembly.

17. The recording head of claim 9, wherein the energy source is a laser diode and wherein the recording head is a thermal assisted recording head.

18. A recording head, comprising:
a slider with a bond pad fabricated on a top surface of the slider;
a head assembly coupled to the slider, the head assembly having an air bearing surface and a top surface opposite the air bearing surface, the head assembly comprising an insulating material;
an energy source having a bottom surface in contact with the top surface of the slider and the head assembly, the energy source having an electrode extending perpendicular to the bond pad and in close proximity to the bond pad; and
a conductive bonding material coupled to the bond pad and the electrode.

19. The recording head of claim 18, further comprising an insulating layer disposed between the slider and the bonding pad.

20. The recording head of claim 18, wherein the conductive bonding material comprises a conductive epoxy.

21. The recording head of claim 18, wherein the conductive bonding material comprises solder.

22. The recording head of claim 18, further comprising:
a second bond pad fabricated on the top surface of the slider;
a sub-mount coupled to the energy source, wherein the sub-mount has a second electrode that is perpendicular to the second bond pad; and
a second conductive material coupled to the second bond pad and the second electrode.

23. The recording head of claim 22, further comprising a head bond pad extending from a surface of the head assembly that is perpendicular to the air bearing surface, wherein the head bond pad is coupled to the first bond pad via an electrically conductive trace.

24. The recording head of claim 23, wherein the electrically conductive trace is disposed along the top surface of the slider and the head assembly.

25. The recording head of claim 18, wherein the energy source is a laser diode and wherein the recording head is a thermal assisted recording head.

* * * * *